(12) United States Patent
Ramsey

(10) Patent No.: US 7,564,461 B1
(45) Date of Patent: *Jul. 21, 2009

(54) ACCELERATION OF GRAPHICS FOR REMOTE DISPLAY USING REDIRECTION OF RENDERING AND COMPRESSION

(75) Inventor: Paul R. Ramsey, Tucson, AZ (US)

(73) Assignee: Sun Microsystems, Inc., Santa Clara, CA (US)

( * ) Notice: Subject to any disclaimer, the term of this patent is extended or adjusted under 35 U.S.C. 154(b) by 451 days.

This patent is subject to a terminal disclaimer.

(21) Appl. No.: 11/174,847

(22) Filed: Jul. 5, 2005

Related U.S. Application Data

(62) Division of application No. 10/117,441, filed on Apr. 5, 2002, now Pat. No. 6,989,836.

(51) Int. Cl.
 G06T 1/00 (2006.01)
 G06F 15/16 (2006.01)
 G06T 1/20 (2006.01)
 G06T 9/00 (2006.01)
(52) U.S. Cl. .................. 345/522; 345/504; 345/506; 345/555
(58) Field of Classification Search .............. 345/504, 345/522, 555, 506
 See application file for complete search history.

(56) References Cited

U.S. PATENT DOCUMENTS

| 6,100,899 | A | * | 8/2000 | Ameline et al. ............. 345/605 |
| 6,249,294 | B1 | | 6/2001 | Lefebvre et al. |
| 6,337,689 | B1 | | 1/2002 | Hochmuth et al. |
| 6,587,112 | B1 | | 7/2003 | Goeltzenleuchter et al. |
| 6,633,242 | B2 | | 10/2003 | Brown |
| 6,989,836 | B2 | | 1/2006 | Ramsey |
| 7,274,368 | B1 | * | 9/2007 | Keslin ....................... 345/522 |
| 2003/0191859 | A1 | | 10/2003 | Ramsey |
| 2003/0191860 | A1 | | 10/2003 | Gadepalli |

OTHER PUBLICATIONS

"Distributed Visualization with OpenGL Vizserver", Zuse Institute Berlin Publication Report, Aug. 2001, Hans-Christian Hege et al. (URL http://www.zib.de/Publications/Reports/ZR-00-31.pdf).*
"Evaluation and extension of SGI Vizserver", SPIE Digital Library, Apr. 2001, Chu et al. URL http://spiedl.aip.org/getabs/servlet/GetabsServlet?prog=normal&id=PSISDG004368000001000063000001&idtype=cvips&gifs=yes.*

* cited by examiner

*Primary Examiner*—Hau H Nguyen
(74) *Attorney, Agent, or Firm*—Meyertons Hood Kivlin Kowert & Goetzel, P.C.; Jeffrey C. Hood; Mark K. Brightwell

(57) ABSTRACT

A system and method are disclosed for improving the remote display of graphics images by the redirection of rendering and the optional use of image data compression. Instead of sending graphics commands over a network and rendering on a remote computer system, graphics commands may be automatically redirected by modified OpenGL functions to local graphics devices without explicit involvement by the graphics application. The modifications to a set of the OpenGL functions on the local system are transparent in the normal mode of rendering and displaying locally. After an image is rendered locally, it may be read back and sent across the network. A standard X Server on the remote system may be sufficient to support this methodology. An X Extension for data decompression on the remote system, however, may allow for more efficient image transmission through the use of image data compression.

18 Claims, 4 Drawing Sheets

ACCELERATION OF GRAPHICS FOR REMOTE DISPLAY USING REDIRECTION OF RENDERING AND COMPRESSION

CONTINUATION DATA

This application is a division of U.S. patent application Ser. No. 10/117,441 entitled "ACCELERATION OF GRAPHICS FOR REMOTE DISPLAY USING REDIRECTION OF RENDERING AND COMPRESSION" filed Apr. 5, 2002 now U.S. Pat. No. 6,989,836 whose inventor is Paul Ramsey which is also hereby incorporated by reference as though fully and completely set forth herein.

BACKGROUND OF THE INVENTION (1) Field of the Invention

This invention relates generally to the field of telecommunication and, more particularly, to a system and method for more effectively rendering on a server computer system and transferring the image data across a network to a remote computer system.

(2) Description of the Related Art

Many graphics applications use the standard OpenGL library for rendering and displaying 3D graphics on local graphics hardware. There are times when it would be desirable to render locally and display remotely because a remote device at the remote system may not be as powerful as the local device, or the remote system may have no 3D capability at all. Unfortunately, OpenGL does not provide an efficient mechanism for local rendering and remote display. Thus, an OpenGL application may slow down dramatically when operating in this mode.

OpenGL may be used to render and display on a remote system by sending commands over a network. However, when a graphics application running on a local computer system is required to display graphics images on a remote computer system, rendering time may be significantly increased, because protocols are not designed for efficient remote rendering and display. The standard OpenGL library functions create a window for the remote system based on the characteristics of the graphics devices in the remote system. The local computer system then renders image data to the remote window.

There exists a need for a system and methodology capable of local rendering and remote display without modification to the graphics software application (especially an OpenGL application) executing on the local computer system.

SUMMARY OF THE INVENTION

The problems set forth above may at least in part be solved by a system and method for improving the remote display of graphics images by the redirection of rendering and the optional use of image data compression. Instead of sending graphics commands over a network and rendering on a remote computer system, graphics commands may be automatically redirected by modified OpenGL functions to local graphics devices without explicit involvement by the graphics application. The modifications to a set of the OpenGL functions on the local system may be transparent in the normal mode of rendering and displaying locally. After an image is rendered locally, it may be read back and sent across the network. A standard X Server on the remote system may be sufficient to support this methodology. An X Extension for data decompression on the remote system, however, may allow for more efficient image transmission through the use of image data compression.

In some embodiments, a network connection may be established between a local computer system and a remote computer system. A user may assert a request to a graphics application for remote display of graphics images. The graphics application uses an OpenGL library, which includes modified OpenGL functions, to create a remote window and a context for the remote window for remote display. A set of the OpenGL functions are modified to redirect the graphics application's device queries to local graphics devices rather than the remote graphics devices. This set may include, but is not limited to, the OpenGL functions glXChooseVisual(), glXQueryExtension(), and glXGetConfig(). These modified OpenGL functions and other modified query functions return information about a local graphics device rather than the remote display device. With this modified information most applications may be willing to create windows on the remote system for use with OpenGL even though the remote system may not actually have any OpenGL capabilities.

To create a context for the remote window, the graphics application may use a modified OpenGL function glXCreateContext. This function may be modified so that when the application attempts to create an OpenGL context for use with the remote window, a context is instead created for a graphics device in the local computer system. The OpenGL function glXMakeCurrent may also be modified so that when the graphics application attempts to attach the context to a remote window, a local pbuffer of the same size as the OpenGL viewport is created and the context is attached to the pbuffer instead of the remote window. The OpenGL function glViewport() may be modified so that if a viewport is changed the pbuffer size may be changed accordingly.

Graphics image frames are rendered to the pbuffer using standard OpenGL functions. Because the context is attached to the pbuffer, the standard rendering functions do not require modification. Subsequent rendering will simply happen to the pbuffer instead of the remote window.

A particular modified OpenGL function, glXSwapBuffers(), may be used to read the graphics image frames from the pbuffer and display the graphics image frames on the remote display. In some embodiments, the OpenGL function glXSwapBuffers() may be modified so that when the application calls the function, the rendered image may be read back from the pbuffer using glReadPixels() and displayed on the remote system using XputImage.

One additional benefit of this method may be that modified OpenGL functions perform according to standard OpenGL behavior when a remote display is not specified. A second additional benefit of this method may be that usage of the OpenGL function glXSwapBuffers() may ensure that an image frame will be completely rendered to the pbuffer before it is read and sent to the remote display. This may ensure that a combined image of portions of two sequential frames (an image tear) will not be read and sent to the remote display.

In other embodiments, the method may also reduce the transmission time by compressing the rendered image frame using a compression algorithm before sending the compressed image to the remote system for decompression and display. Usage of the modified OpenGL function glXSwapBuffers() may ensure that a compression algorithm is applied to complete frames to take full advantage of instances where only a portion of the pixels change values in a sequence of frames. An optional X Extension and a decompression software program may be used in the remote system to decompress the graphics images. Using image data compression may achieve a significant improvement in frames per second display capability for the remote system.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
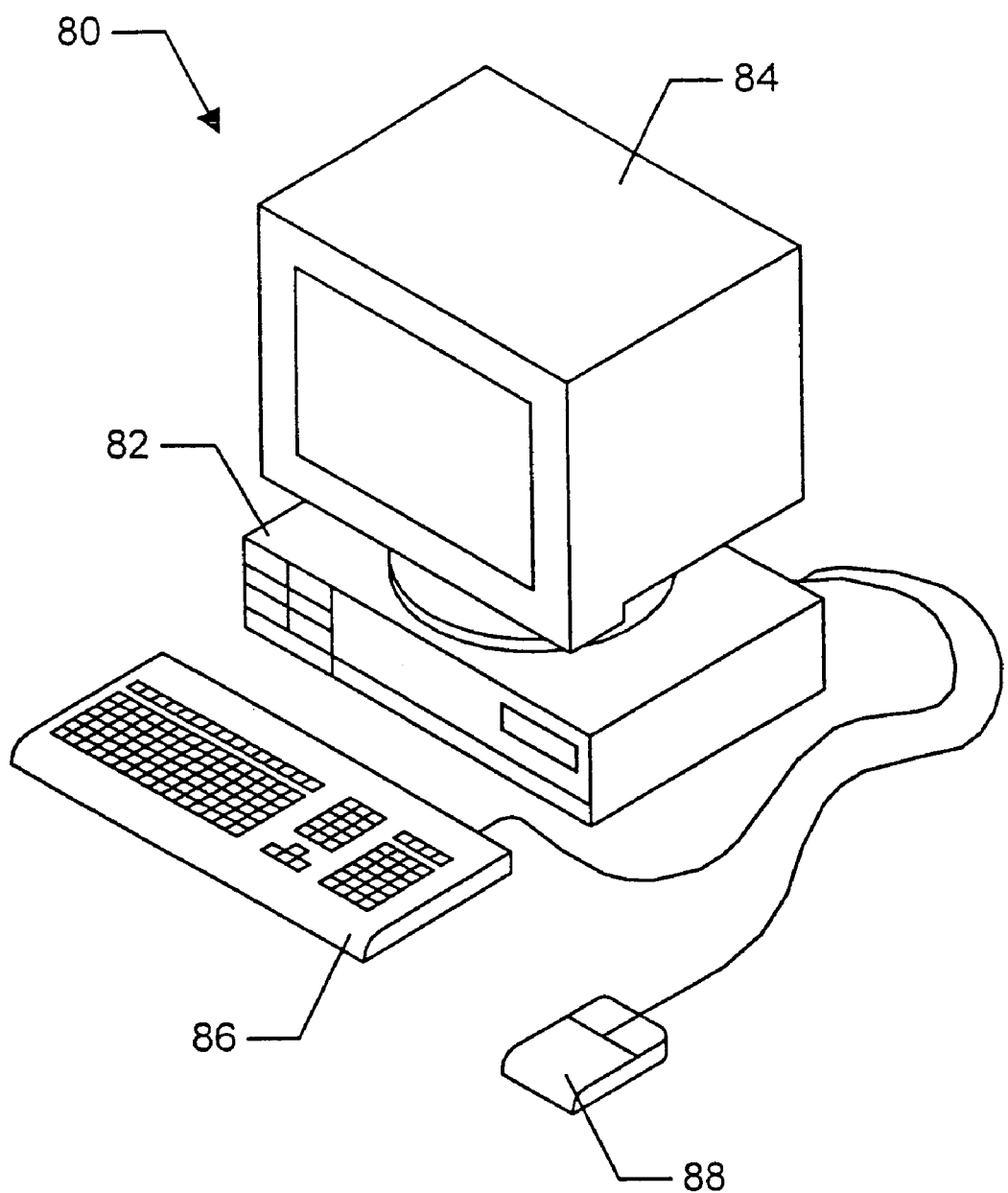
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
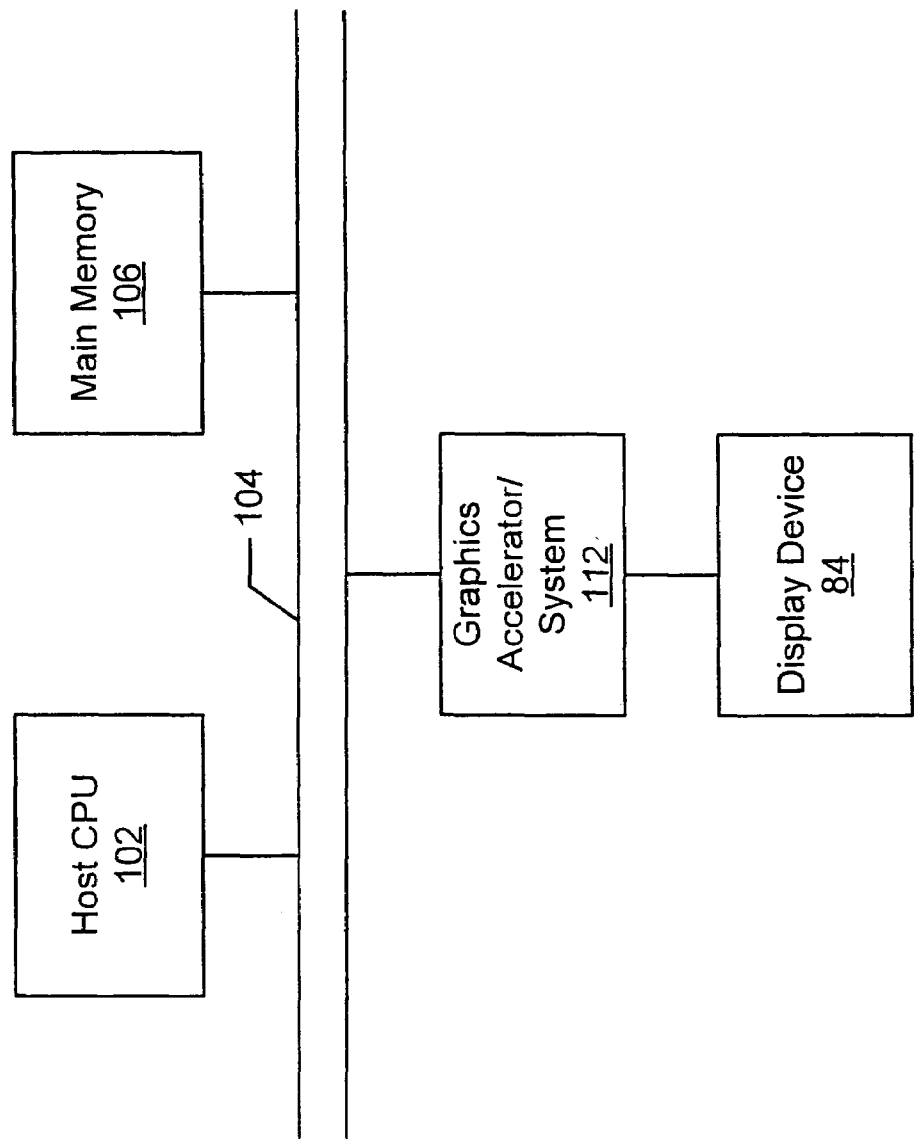
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
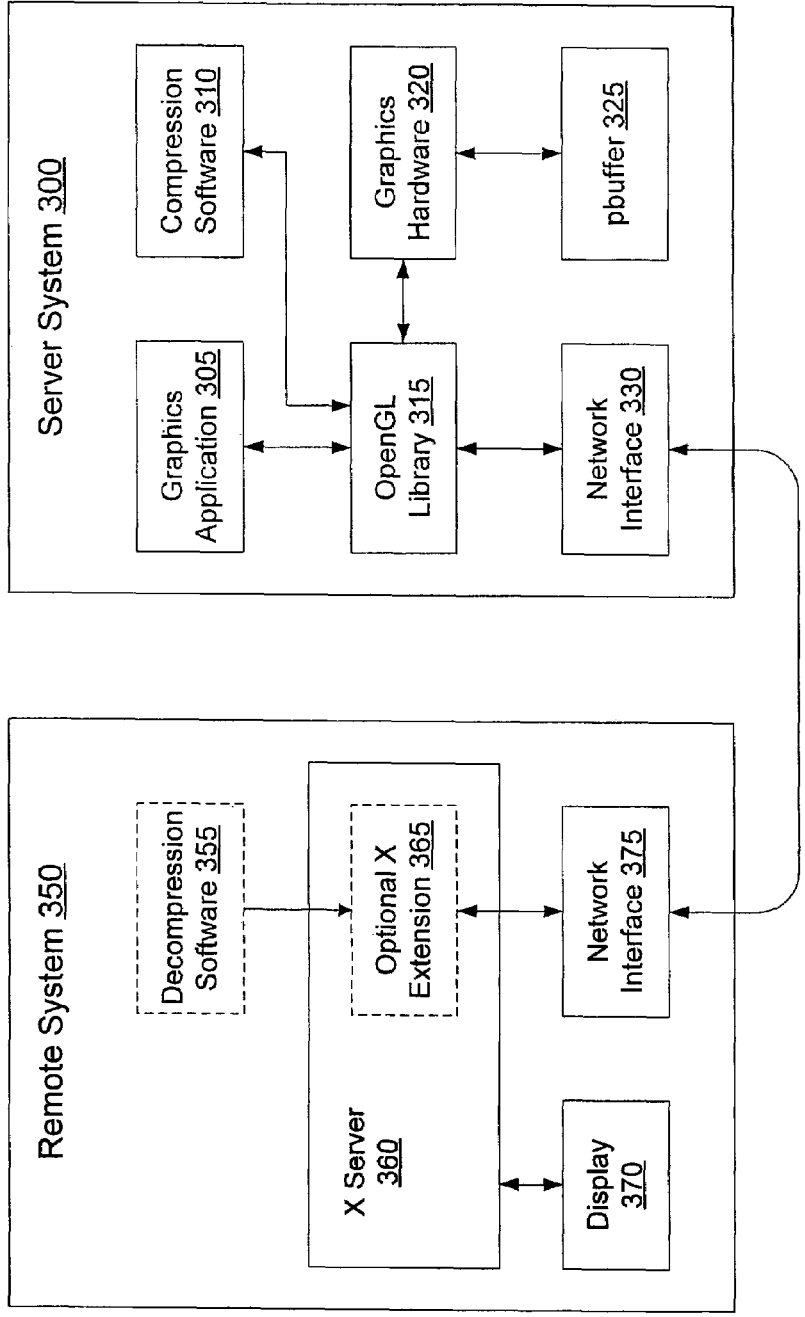
FIG. 3 is a simplified block diagram of a communication system for remote display using redirection of rendering and possible compression.

Communication System—FIG. 3

A communication system 390 for remote display of graphics images, using redirection of rendering, is illustrated in FIG. 3. In some embodiments, the communication system includes a computer system performing as a server system 300, and a computer system performing as a remote system 350. The server system 300 may include graphics rendering hardware 320 and a pbuffer 325. As is well known in the art, the server system may also include a server memory (e.g. main memory 106) and a server processor (e.g. host CPU 102) coupled to the server memory. The server memory stores a graphics software program (or graphics application) 305 and an OpenGL Library 315 of software functions. In some embodiments, the OpenGL Library 315 of software functions may include standard OpenGL functions, a set of modified OpenGL functions, and a modified particular OpenGL function. The server processor may be operable to execute the graphics software program to implement calling one or more of the set of modified OpenGL functions to create and attach a graphics window context, created for a remote window, to the pbuffer 325 instead, rendering an image to the pbuffer 325, and calling the particular OpenGL function, which may be modified to induce transfer of the image from the pbuffer 325 to a window in the remote system.

The remote system 325 may comprise: a remote display 370, a remote memory that stores an X Server software program 360, and a remote processor coupled to the remote memory. The processor may be operable to execute the X Server software program 360 to receive an image from the server system 300 and display the image on the remote display 370.

The communication system 390 may also include a compression software program 310 stored on the server memory, an X Extension 365 for the X Server stored in the remote memory, and a decompression software program 355 stored in the remote memory.

Figure 4:
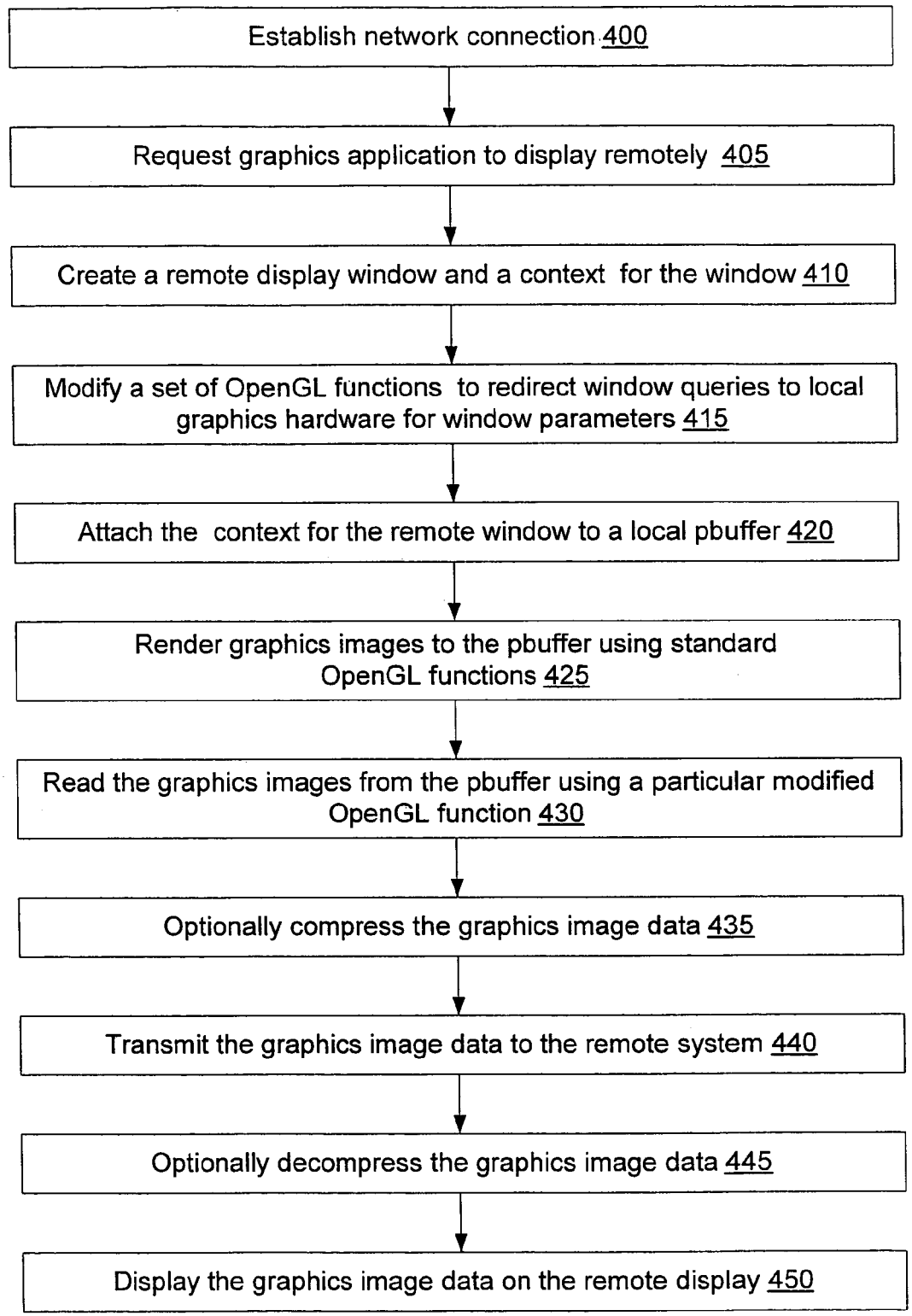
FIG. 4 is a flow chart of a method for remote display using redirection of rendering and possible compression.

Method for Remote Display Using Redirection of Rendering—FIG. 4

FIG. 4 illustrates a method for remote display using redirection of rendering. In some embodiments, a network connection may be established (step 400) between a local computer system (also referred to herein as a server system or as a first computer system) and a remote computer system (also referred to herein as a second computer system). A user may assert a request to a graphics application for remote display of graphics images (step 405). The graphics application uses an OpenGL library, which includes modified OpenGL functions, to create a remote window and a context for the remote window for remote display (step 410).

A set of the OpenGL functions are modified to redirect the graphics application's device queries to local graphics devices rather than the remote graphics devices (step 415). In some embodiments, this set may include, but is not limited to, the Open GL functions glXChooseVisual(), glXQueryExtension(), and glXGetConfig(). These modified Open GL functions and other modified query functions return information about a local graphics device rather than the remote display device. With this modified information most applications may be willing to create windows on the remote system for use with OpenGL even though the remote system may not actually have any OpenGL capabilities.

To create a context for the remote window, the graphics application may use a modified OpenGL function glXCreateContext. This function may be modified so that when the application attempts to create an OpenGL context for use with the remote window, a context is instead created for a graphics device in the local computer system.

The OpenGL function glXMakeCurrent may also be modified so that when the graphics application attempts to attach the context to a remote window, a local pbuffer of the same size as the OpenGL viewport is created and the context is attached to the pbuffer instead of the remote window (step 420). The OpenGL function glViewport() may be modified so that if a viewport is changed the pbuffer size may be changed accordingly.

Graphics image frames are rendered to the pbuffer using standard OpenGL functions (step 425). Because the context is attached to the pbuffer, the standard rendering functions do not require modification. Subsequent rendering will simply happen to the pbuffer instead of the remote window.

A particular modified OpenGL function, glXSwapBuffers(), may be used to read the graphics image frames from the pbuffer (step 430) and display the graphics image frames on the remote display (steps 440 & 450). In some embodiments, the OpenGL function glXSwapBuffers() may be modified so that when the application calls the function, the rendered image may be read back from the pbuffer using glReadPixels() (or other device specific functions) and displayed on the remote system using XputImage (or other remote image display functions may be used). In other embodiments, the OpenGL functions glFinish() or glFlush() may be modified for transferring the rendered image to the remote system.

One additional benefit of this method may be that modified OpenGL functions perform according to standard OpenGL behavior when a remote display is not specified. A second benefit may be that a remote system with only an X Server (no OpenGL capabilities) may be sufficient to support this method. A third benefit may be that usage of the OpenGL function glXSwapBuffers() may ensure that an image frame will be completely rendered to the pbuffer before it is read and sent to the remote display. This may ensure that a combined image of portions of two sequential frames (an image tear) will not be read and sent to the remote display.

In other embodiments, the method may also reduce the transmission time by compressing the rendered image frame using a compression algorithm (step 435) before sending the compressed image to the remote system (step 440) for decompression (step 445) and display (step 450). Usage of the modified OpenGL function glXSwapBuffers() may ensure that a compression algorithm is applied to complete frames to take full advantage of instances where only a portion of the pixels change values in a sequence of frames. An optional X Extension and a decompression software program may be used in the remote system to decompress the graphics images. There are a number of codecs (compression-decompression algorithms) that may be used. In some embodiments, a codec invented by Russ Brown, based on the discrete cosine transform (DCT), may be utilized. Please see U.S. patent application Ser. No. 09/779,333 entitled "Entropy Coding Using Adaptable Prefix Codes", filed on Feb. 8, 2001. Using image data compression may achieve a significant improvement in frames per second display capability for the remote system.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method comprising:
   executing a graphics application on a first computer;
   wherein said executing the graphics application on the first computer comprises:
   calling one or more OpenGL rendering functions that result in an image being rendered into a buffer associated with the first computer, and
   calling one or more modified OpenGL functions to induce display of the image from the buffer, on a display coupled to a second computer, through an X Server executing on the second computer;

wherein said executing the graphics application on the first computer further comprises:

asserting queries, targeted for the X Server executing on the second computer, for graphics information associated with the second computer by calling a first set of glX functions, wherein the first set of glX functions have been modified to provide graphics information associated with the first computer instead of the graphics information associated with the second computer;

asserting a request, targeted for the X Server, to create a graphics context by calling the glXCreateContext function, wherein the glXCreateContext function has been modified to create the graphics context for graphics hardware associated with the first computer instead of for graphics hardware associated with the second computer; and asserting a request, targeted for the X Server, to attach the graphics context to a window associated with the second computer by calling a glXMakeCurrent function, wherein the glXMakeCurrent function has been modified to attach the graphics context to the buffer, associated with the first computer, instead of attaching the graphics context to the window associated with the second computer.

2. The method of claim 1, wherein a modified glXSwapBuffer function is one of the one or more modified OpenGL functions.

3. The method of claim 1, wherein a modified glFinish function is one of the one or more modified OpenGL functions.

4. The method of claim 1, wherein the first computer is a local computer and the second computer is a remote computer.

5. The method of claim 1, wherein the second computer has no graphics hardware.

6. The method of claim 1, wherein the second computer has graphics hardware that is not as powerful as graphics hardware associated with the first computer.

7. The method of claim 1, wherein modified OpenGL functions are stored in a memory, wherein each modified OpenGL function is a set of program instructions, and wherein said calling one or more modified OpenGL functions comprises reading a corresponding one or more of the sets of program instructions from the memory and executing the program instructions.

8. The method of claim 1, wherein modified OpenGL functions are stored in a memory medium, wherein each modified OpenGL function is a set of program instructions, and wherein said calling one or more modified OpenGL functions comprises reading a corresponding one or more of the sets of program instructions from the memory medium and executing the program instructions.

9. A computer-readable memory medium storing a set of program instructions, wherein the program instructions are executable to:

run a graphics application on a first computer;

wherein said running the graphics application on the first computer comprises:

calling one or more OpenGL rendering functions which result in an image being rendered into a buffer associated with the first computer, and calling one or more modified OpenGL functions to induce display of the image from the buffer, on a display coupled to a second computer, through an X Server executing on the second computer;

wherein said running the graphics application on the first computer further comprises:

asserting queries, targeted for the X Server executing on the second computer, for graphics information associated with the second computer by calling a first set of glX functions, wherein the first set of glX functions have been modified to provide graphics information associated with the first computer instead of the graphics information associated with the second computer;

asserting a request, targeted for the X Server, to create a graphics context by calling the glXCreateContext function, wherein the glXCreateContext function has been modified to create the graphics context for graphics hardware associated with the first computer instead of for graphics hardware associated with the second computer; and asserting a request, targeted for the X Server, to attach the graphics context to a window associated with the second computer by calling a glXMakeCurrent function, wherein the glXMakeCurrent function has been modified to attach the graphics context to the buffer, associated with the first computer, instead of attaching the graphics context to the window associated with the second computer.

10. The computer-readable memory medium of claim 9, wherein the first computer is a local computer and the second computer is a remote computer.

11. The computer-readable memory medium of claim 9, wherein the graphics application is a 3D graphics application.

12. A method for executing a graphics application, the method comprising:

calling OpenGL rendering functions which result in an image being rendered into a first buffer of a graphics accelerator that is coupled to a first computer; and calling one or more particular OpenGL functions, wherein program code for the one or more particular OpenGL functions have been modified to induce:

transfer of the image from the first buffer to a second computer, and display of the image on a display associated with the second computer;

wherein program code for one of the particular OpenGL functions has been modified to call an XPutImage function, wherein the call to the XPutImage function induces the transfer of the image to an X Server executing on the second computer, and induces the X Server to perform an internal PutImage operation to display the image on the display.

13. The method of claim 12, wherein the first computer is a local computer and the second computer is a remote computer.

14. The method of claim 12, wherein said program code for said one of the particular OpenGL functions has been modified to read the image from the first buffer into a second buffer in a system memory of the first computer, prior to transfer of the image to the second computer.

15. The method of claim 14, wherein said program code has been modified to read the image from the first buffer by calling a glReadPixels function.

16. The method of claim 14, wherein said program code has been modified to read the image from the first buffer into the second buffer by calling a device specific function.

17. A computer system comprising:

a memory storing program instructions; and a processor configured to read and execute the program instructions, wherein the program instructions are executable by the processor to implement:

calling OpenGL rendering functions which result in an image being rendering into a first buffer of a graphics accelerator coupled to the computer system; and calling one or more particular OpenGL functions, wherein program code for the one or more particular OpenGL functions have been modified to induce:

transfer of the image from the first buffer to a remote computer system, and display of the image on a display associated with the remote computer system;

wherein program code for one of the particular OpenGL functions has been modified to compress the image and to call an X Extension function, wherein the call to the X Extension function (a) induces the transfer of the compressed image to an X Server executing on the remote computer system, and (b) induces the X Server to execute an X Extension code corresponding to the X Extension function which decompresses the compressed image and invokes an internal PutImage operation to display the decompressed image on said display.

18. The computer system of claim 17, wherein said program code for said one of the OpenGL functions has been modified to read the image from the first buffer into a second buffer in a system memory of the first computer, prior to transfer of the image to the remote computer system.

* * * * *